United States Patent
Kawaguchi et al.

(10) Patent No.: US 6,285,820 B1
(45) Date of Patent: Sep. 4, 2001

(54) VIDEO TAPE RECORDER

(75) Inventors: Mitsuyoshi Kawaguchi; Takashi Sasaya; Fumiaki Henmi, all of Kanagawa; Takao Abe, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/018,744

(22) Filed: Feb. 4, 1998

Related U.S. Application Data

(63) Continuation of application No. PCT/JP97/01922, filed on Jun. 6, 1997.

(30) Foreign Application Priority Data

Jun. 6, 1996 (JP) .................................................. 8-144517

(51) Int. Cl.$^7$ .................................................. H04N 5/91
(52) U.S. Cl. .................................................. 386/78; 386/88
(58) Field of Search .................................................. 386/46, 95, 96, 386/112, 123, 130, 78, 108, 88, 124, 131; H04N 5/91

(56) References Cited

U.S. PATENT DOCUMENTS 5,394,275 * 2/1995 Iketani et al. ........................ 386/123
5,583,654 * 12/1996 Oguro .................................... 386/96

FOREIGN PATENT DOCUMENTS

| 3-63901 | 3/1991 | (JP) . |
| 3-107285 | 5/1991 | (JP) . |
| 6-12789 | 1/1994 | (JP) . |

\* cited by examiner

*Primary Examiner*—Huy Nguyen
(74) *Attorney, Agent, or Firm*—Frommer Lawrence & Haug LLP; William S. Frommer; Darren M. Simon

(57) ABSTRACT

In a video tape recorder for recording a video signal having a first field frequency and a video signal a second field frequency, substantial centers 11a of lengths of recording tracks, on a magnetic tape 7, for the video signals having the first and second field frequencies are recorded thereon at the same position.

5 Claims, 4 Drawing Sheets

VIDEO TAPE RECORDER

This is a continuation of copending International Application PCT/JP97/01922 having an international filing date of Jun. 6, 1997.

TECHNICAL FIELD

The present invention relates to a video tape recorder suitable for application to recording a high picture-quality video signal, for example.

BACKGROUND ART

According to a previously proposed standard for a high picture-quality video signal, a field frequency is 60 Hz, a line frequency is 33.75 kHz, and the number of lines per one frame is 1125.

When a television broadcasting of NTSC system is generally broadcasted at present and recording and editing processings and so on are carried out, a field frequency of 59.94 Hz and a line frequency of 15.75 Hz are used and the number of lines per one frame is 525.

While a demand for recording and reproducing a high-resolution video signal and carrying out the broadcasting with using it has been increased, the current system (i.e., the NTSC system or a PAL system) is still dominant in view of a systematic environment. As a result, it is necessary to convert a source recorded by a high-resolution video system into that of the NTSC system for broadcasting, recording and reproducing it. Therefore, it is sometimes observed that a video tape recorder for recording, reproducing and editing the high-resolution video signal is employed in the systematic environment of the NTSC system. Under such circumstance, it is necessary for the video tape recorder of the high-resolution video system to process even a video signal having a field frequency of 59.94 Hz without any problems.

In this case, a recording format used when a signal is recorded on a magnetic tape is a problem. Specifically, if the signals have different field frequencies and are to be recorded on a magnetic tape as they are, two kinds of track formats, i.e., two kinds of track patterns are required.

For example, when a signal is recorded on a magnetic tape with field frequencies of 60 Hz and 59.94 Hz by a digital video tape recorder employing the same recording clock frequency, total lengths of tracks on the magnetic tape becomes 125.275 mm and 125.150 mm, respectively. A difference between the two track lengths is 0.125 mm.

It is not preferable that one video tape recorder employs two kinds of formats, in view of management of a magnetic tape and complication of a hardware.

Therefore, in order to solve the above problem, a recording format is set completely the same by allowing field frequencies (59.94 Hz/60 Hz) to be changed in one video tape recorder in order to reproduce data recorded with a field frequency of 59.94 Hz and vice versa. However, in order to set the tape recording pattern completely the same, crystals for frequency oscillators respectively corresponding to the field frequencies of 59.94 Hz/60 Hz must be prepared, which leads to a problem of the manufacturing costs.

DISCLOSURE OF THE INVENTION

In view of such aspects, it is an object of the present invention to provide a vide tape recorder which has only one clock circuit and, with a simple arrangement, can record both of a video signal having a field frequency of 60 Hz and a video signal having a field frequency of 59.94 Hz on a magnetic tape with a recording format of only one kind.

A video tape recorder according to the present invention is a video tape recorder for recording a video signal having a first field frequency and a video signal a second field frequency. Substantial centers of lengths of recording tracks, on a magnetic tape, for the video signals having the first and second field frequencies are recorded thereon at the same position.

According to the present invention, since the substantial centers of lengths of recording tracks, on a magnetic tape, for the video signals having the first and second field frequencies are recorded thereon at the same position, errors on both of recording start and end sides of a recording track caused when the video signals having the first and second field frequencies are recorded on the magnetic tape can fall within a tolerance of a recording format of this video tape recorder. Therefore, it is possible to record the video signals on one magnetic tape with only one recording format.

BEST MODE FOR CARRYING OUT THE INVENTION

Figure 1:
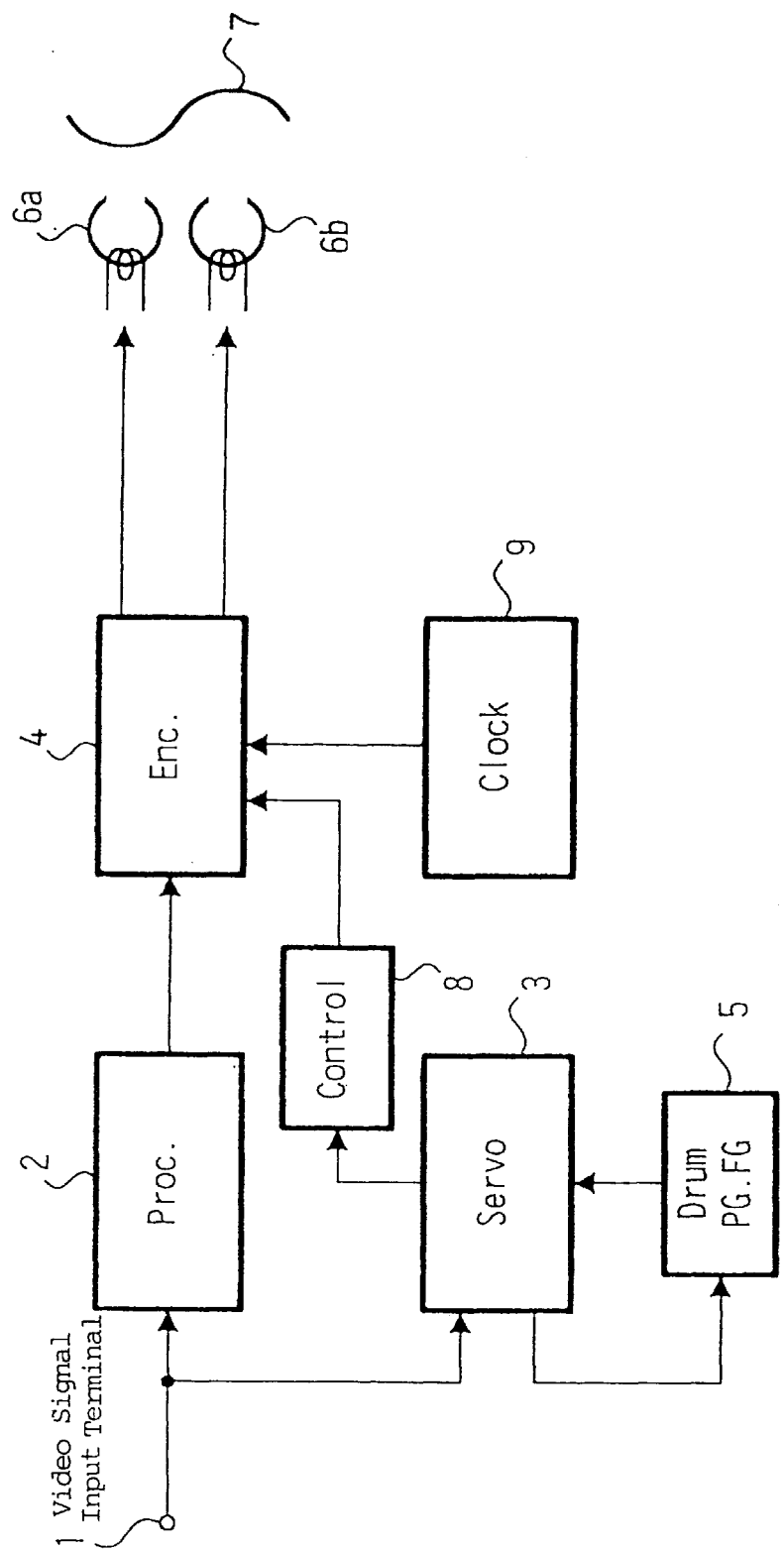
FIG. 1 is a diagram showing an arrangement of a video tape recorder according to an embodiment of the present invention.

A video tape recorder for recording a high-resolution video signal on a magnetic tape (hereinafter referred to as a VTR) according to an embodiment of the present invention will hereinafter be described with reference to the accompanying drawings. FIG. 1 is a diagram showing an arrangement of a recording system of the VTR according to the embodiment of the present invention by way of example.

As shown in FIG. 1, an input terminal 1 is input with a video signal to be recorded. The video signal supplied to the input terminal 1 can have both of the field frequencies of 60 Hz and 59.94 Hz.

Reference numeral 2 represents a processor circuit formed of a microcomputer. The processor circuit detects whether the video signal input thereto from the input terminal 1 has a field frequency of 60 Hz or 59.94 Hz and, in response to a detection result, carries out a signal processing corresponding to the detected field frequency. An order of the signal processings of the processor circuit 2 is previously stored in a memory (not shown) in the processor circuit 2. The predetermined order is read out in response to the detected field frequency and the processor circuit carries out the signal processing of the input video signal in accordance with the read program.

The input video signal is also supplied to a servo circuit 3 for controlling an operation of a tape travel system of the VTR.

The servo circuit 3 is supplied with the input video signal as described above and also supplied with a PG signal obtained from a pulse generator and an FG signal obtained from a frequency generator, from a rotary drum 5. The servo circuit generates and outputs a servo signal and so on for the rotary drum 5.

The servo circuit 3 detects whether the input video signal has a field frequency of 59.94 Hz or 60 Hz and, in response to a detection result, outputs a recording enable signal used for controlling a recording start timing to a controller circuit 8. While, as described above, both of the processor circuit 2 and the servo circuit 3 detects the field frequency of the input video signal, a common processing unit may be provided at the preceding stage of the processor circuit 2 and the servo circuit 3 to carry out this detection processing.

An encoder circuit 4 compresses and encodes a video signal supplied from the processor circuit 2 and then subjects it to an error correction coding processing and so on, forming a recording signal.

The controller circuit 8 outputs the recording enable signal supplied from the servo circuit 3 to the encoder circuit 4. This recording enable signal is used to control an output timing of the video signal encoded by the encoder circuit.

Reference numeral 9 represents a clock signal generator circuit which supplies a clock signal to the encoder circuit 4 for forming the encoded video signal to be recorded. The clock signal generator circuit 9 is used for the processings of both of the video signals having the field frequencies of 59.94 Hz and 60 Hz. Specifically, the clock signal generator circuit constantly supplies a constant clock regardless of the field frequency.

Magnetic heads 6a, 6b provided on the rotary drum 5 and supplied with the encoded video signal from the encoder circuit 4 record the video signal on a magnetic tape 7 with forming a predetermined recording track thereon with reference to the timing of the recording enable signal supplied from the servo circuit 3.

There will subsequently be described with reference to FIGS. 3 and 4 a principle that if substantial centers of lengths of the recording tracks respectively obtained when the field frequency is 59.94 Hz and 60 Hz is constantly recorded at the same position on the magnetic tape, the same format can be employed.

Figure 3:
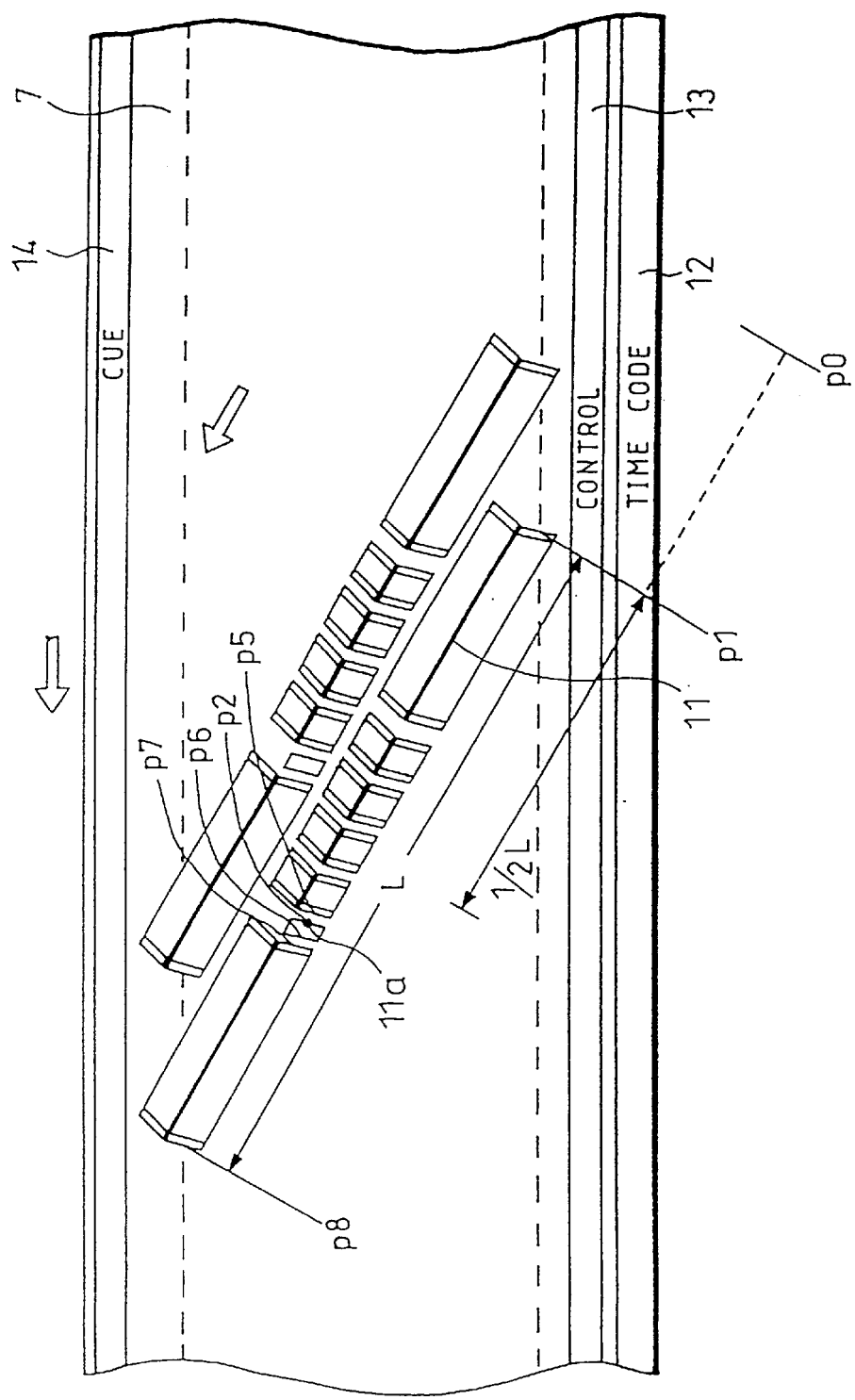
FIG. 3 is a diagram showing a recording pattern of a magnetic tape by way of example.

FIG. 3 is a diagram showing a recording track pattern of the video signal recorded on the tape. If the field frequency is 59.94 Hz, a track length L of the recording track is 125.150 mm, and if the field frequency is 60 Hz, a track length L of the recording track is 125.275 mm. Since the difference between both of the track lengths L si 0.125 mm, if recording start positions P1 of the respective tracks are aligned, the difference between both of the track lengths directly reflects a displacement between recording end positions P8 thereof, which makes it impossible to employ the same format.

Therefore, the centers of the respective recording tracks are initially aligned at a certain position on the tape, thus dispersing and allocating the difference (0.125 mm) between the track lengths to a recording start side and a recording end side by a half thereof (0.0625 mm), respectively.

While a point of ½ L is preferable as a reference point as a center of the recording track, the point is in the middle of a data recording area in the recording track of this embodiment and hence is not proper as the reference point.

Accordingly, in this case, a start ping 11a, which is displaced from the position of ½ L toward the recording end direction by about 3.8 mm, for a block (SAT block) where a tracking data is recorded is employed as the reference point. If the reference point (the start point of the SAT block) of the video signal having the field frequency of 59.94 Hz and the reference point (the start point of the SAT block) of the video signal having the field frequency of 60 Hz are aligned at the same position on the tape, as clearly shown from FIG. 4, the difference between the two recording tracks is $d1=0.00612$ mm on the recording start side and $d2=0.00587$ mm on the recording end side.

A standard recording track employing as a recording start point STDS and a recording end point STDE positions located in the middle points of the differences between the recording tracks on both sides is set, and the servo circuit 3 and so on are adjusted so that the recording should be carried out in accordance with the standard recording track. If the standard recording track is employed as the reference, displacements between the standard recording track and the recording tracks employed in cases of the field frequencies of 59.94 Hz and 60 Hz becomes $d1/d2=0.03306$ mm on the recording start side at maximum and $d1/d2=0.02835$ mm on the recording end side at maximum, which can fall within a track-length error range ($\pm 0.07$ mm) in the VTR according to the embodiment. Specifically, it becomes possible to record the video signals having the field frequencies of two kinds with the same format.

Figure 4:
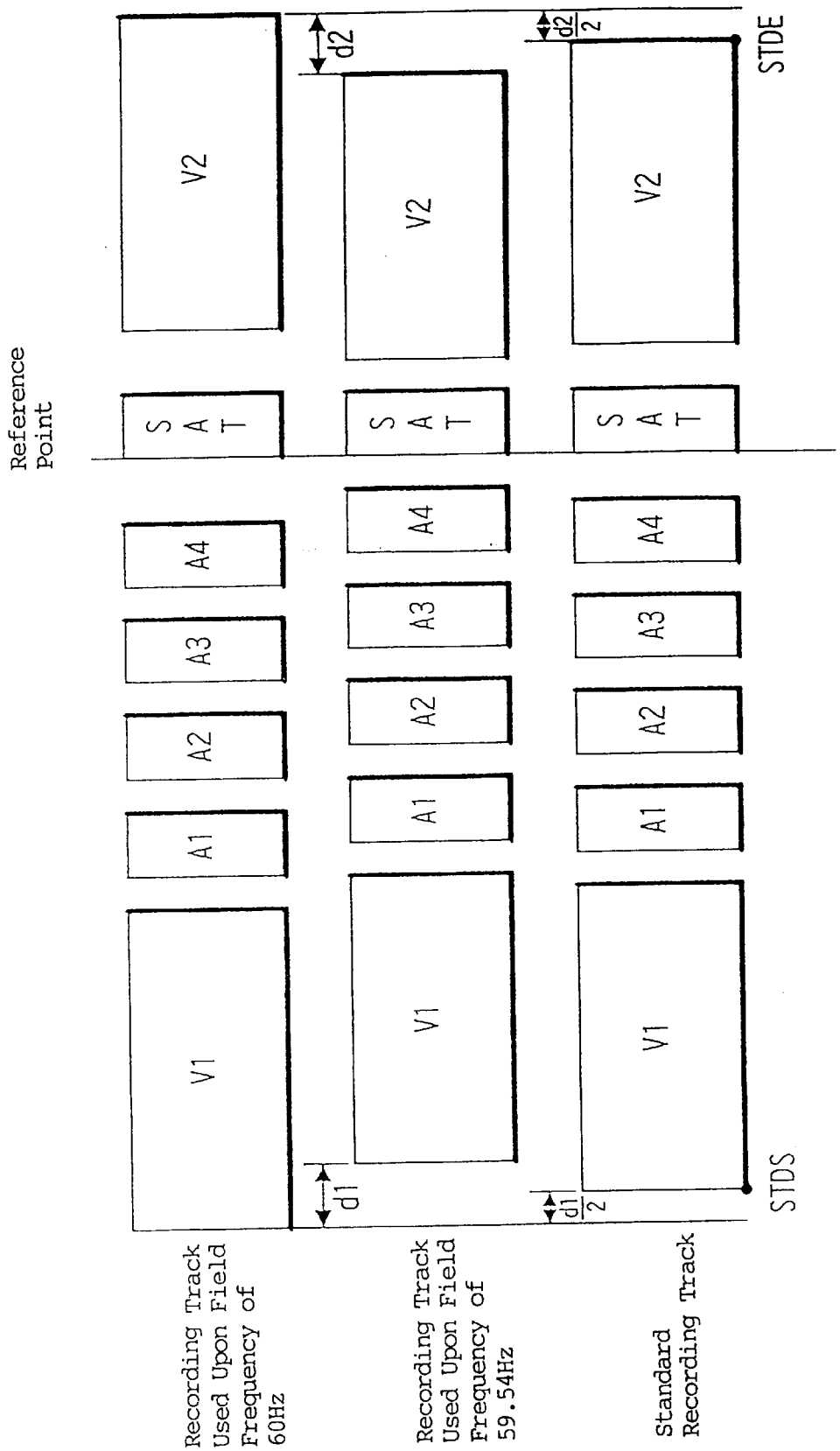

Areas V1, V2 shown in FIG. 4 are data areas where video data are recorded, and areas A1, A2, A3, A4 are data areas where audio data are recorded.

Figure 2:
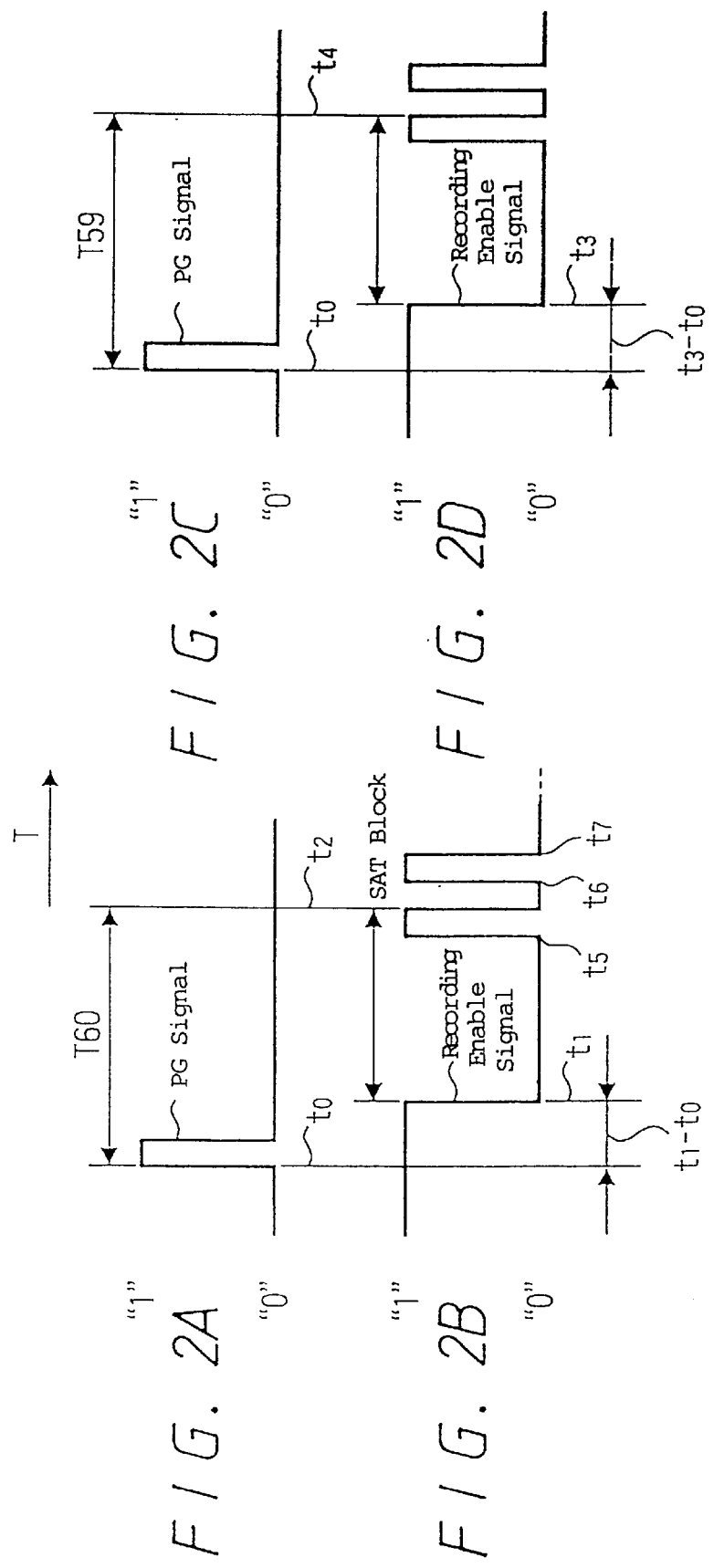
FIGS. 2 and 4 are diagrams used to explain the present invention.

A means for displacing a recording start timing in response to the field frequency as described above will be described with reference to FIGS. 2 and 3. As shown in FIGS. 2A, and 2B, when the field frequency of the input video signal is 60 Hz, if the PG signal is output from the rotary drum 5 at a timing t0, the servo circuit 3 generates the recording enable signal at a timing t1 to supply it to the rotary drum 5 and the controller circuit 8. The PG signal output at the timing t0 indicates that the magnetic heads 6a, 6b on the rotary drum 5 are located at certain reference rotation positions. With reference to this signal, the recording start timing and so on of each of the recording tracks are determined. In this case, the timing t1 is set so that a time obtained by calculation of a time difference between the timing t0 and the recording start point (STDS) of the standard recording track and a time difference between the recording start point (STDS) of the standard recording track and the recording start point of the recording track used when the field frequency is 60 Hz should be t1-t0.

The encoder circuit 4 supplied with the recording enable signal from the servo circuit 3 (through the controller circuit 8) transmits the encoded video signals to the magnetic heads 6a, 6b of the rotary drum 5. The magnetic heads 6a, 6b supplied with the encoded video signals record the video signal on the tape 7 in accordance with the recording enable signal.

Timings t2, t5, t6, t7 shown in FIG. 2B represents recording start timings at points p2, p5, p6, p7 shown in FIG. 3, respectively.

When the field frequency is 59.94 Hz, as shown in FIGS. 2C, 2D, if the PG signal is output from the rotary drum 5 at the timing t, then the servo circuit 3 generates the recording enable signal at the timing t3 and supplies it to the controller circuit 8 and the rotary drum 5. As described above, the timing t3 is set so that a time obtained by calculation of a time difference between the timing t0 and the recording start point (STDS) of the standard recording track and a time difference between the recording start point (STDS) of the standard recording track and the recording start point of the recording track used when the field frequency is 59.94 Hz should be t3-t0.

Similarly, the encoded video signal is recorded on the magnetic tape 7 by the magnetic heads 6a and 6b in accordance with the recording enable signal.

Therefore, according to this embodiment, it is possible to record both of the video signal having the field frequency of 59.94 Hz and the video signal having the field frequency of 60 Hz on the magnetic tape with the same format, which facilitates the management of the magnetic tape. Moreover, only one kind of the recording clock signal is required, which advantageously simplifies the hardware to that extent.

When the magnetic tape thus recorded is reproduced, a reproducing apparatus using the field frequency of 60 Hz or 59.94 Hz can be employed.

It is needless to say that the present invention is not limited to the above embodiment and various arrangement can be effected without departing from a gist of the present invention.

What is claimed is:

1. A video tape recorder having a single clock frequency recording means for recording tracks of a first type video signal having a first field frequency and a second type video signal having a second field frequency onto a magnetic tape; wherein the tracks corresponding to said first type video signal and said second type video signal differ in length by an amount greater than an end track-length error and less than twice said end track-length error; said end track-length error being the margin-of-error distance from each edge of said magnetic tape for recording a track; said video tape recorder including means for recording each track such that a reference point located substantially in the center of each track of a video signal is recorded at a corresponding point located substantially in the center of the magnetic tape such that the difference in length at each end of the tracks between tracks corresponding to said first type video signal and said second type video signal is less than said end track-length error.

2. A video tape recorder for recording tracks of a first type video signal having a first field frequency and a second type video signal having a second field frequency onto a magnetic tape, wherein the tracks corresponding to said first type video signal and said second type video signal differ in length by an amount greater than an end track-length error and less than twice said end track-length error; said end track-length error being the margin-of-error distance from each edge of said magnetic tape for recording a track; said video tape recorder comprising:

input means for inputting an input signal to be recorded;

clock generating means for generating a constant clock signal regardless of the field frequency of said input signal;

detecting means for detecting the field frequency of said input signal, thereby determining whether the signal is a first type video signal or a second type video signal;

timing signal generating means for generating a timing signal on the basis of the detected field frequency of said input signal; and recording means for recording tracks of said input signal onto said magnetic tape in response to said timing signal; each track being recorded such that a reference point located substantially in the center of each track of said input signal is recorded at a corresponding point located substantially in the center of the magnetic tape such that the difference in length at each end of the tracks between tracks corresponding to said first type video signal and said second type video signal is less than said end track-length error.

3. A video tape recorder according to claim 2, wherein said first field frequency is 59.94 Hz and said second field frequency is 60 Hz.

4. A recording method for recording tracks of a first type video signal having a first field frequency and a second type video signal having a second field frequency onto a magnetic tape; wherein the tracks corresponding to said first type video signal and said second type video signal differ in length by an amount greater than an end track-length error and less than twice said end track-length error; said end track-length error being the margin-of-error distance from each edge of said magnetic tape for recording a track; said recording method comprising the steps of:

inputting an input signal to be recorded;

generating a constant clock signal regardless of the field frequency of said input signal;

detecting the field frequency of said input signal, thereby determining whether the signal is said first type video signal or said second type video signal;

generating a timing signal on the basis of the detected field frequency of said input signal; and recording tracks of said input signal onto said magnetic tape in response to said timing signal; each track being recorded such that a reference point located substantially in the center of each track of said input signal is recorded at a corresponding point located substantially in the center of the magnetic tape such that the difference in length at each end of the tracks between tracks corresponding to said first type video signal and said second type video signal is less than said end track-length error.

5. A recording method according to claim 4, wherein said first field frequency is 59.94 Hz and said second field frequency is 60 Hz.

* * * * *